(12) United States Patent
Hakoyama et al.

(10) Patent No.: US 11,776,411 B2
(45) Date of Patent: Oct. 3, 2023

(54) SHIP NAVIGATION ASSISTING DEVICE

(71) Applicant: TOKYO KEIKI INC., Tokyo (JP)

(72) Inventors: Tadashige Hakoyama, Tokyo (JP); Osamu Yagi, Tokyo (JP)

(73) Assignee: Tokyo Keiki Inc., Tokyo (JP)

( * ) Notice: Subject to any disclaimer, the term of this patent is extended or adjusted under 35 U.S.C. 154(b) by 444 days.

(21) Appl. No.: 16/975,775

(22) PCT Filed: Mar. 20, 2019

(86) PCT No.: PCT/JP2019/011684
§ 371 (c)(1),
(2) Date: Aug. 26, 2020

(87) PCT Pub. No.: WO2019/182007
PCT Pub. Date: Sep. 26, 2019

(65) Prior Publication Data
US 2020/0410869 A1 Dec. 31, 2020

(30) Foreign Application Priority Data
Mar. 22, 2018 (JP) .................. 2018-054149

(51) Int. Cl.
*G08G 3/02* (2006.01)
*G01S 13/93* (2020.01)
(Continued)

(52) U.S. Cl.
CPC .............. *G08G 3/02* (2013.01); *B63B 49/00* (2013.01); *G01C 21/22* (2013.01); *G01S 13/937* (2020.01)

(58) Field of Classification Search
CPC ......... G08G 3/02; G01S 13/937; B63B 49/00; B63B 43/18; G01C 21/22
See application file for complete search history.

(56) References Cited

U.S. PATENT DOCUMENTS

| | | | |
|---|---|---|---|
| 5,515,287 A | 5/1996 | Hakoyama et al. | |
| 6,408,248 B1 | 6/2002 | Yancy, Jr. et al. | |
| 9,927,520 B1 * | 3/2018 | Ward | G01S 15/93 |

FOREIGN PATENT DOCUMENTS

| | | |
|---|---|---|
| DE | 19508255 A1 | 9/1995 |
| GB | 2287318 A | 9/1995 |

(Continued)

OTHER PUBLICATIONS

Corresponding European Patent Application No. 19771861.2, Extended European Search Report dated Nov. 16, 2021.
(Continued)

*Primary Examiner* — Tyler J Lee
(74) *Attorney, Agent, or Firm* — Cooper Legal Group LLC

(57) ABSTRACT

A ship navigation assisting device includes: an area setter 304 that sets, for a target ship, a polygonal safe navigation area defined by a plurality of vertices and surrounding the target ship; a collision point calculator 305 that calculates, based on a speed of the own ship, a relative position between the own ship and the target ship, and a velocity vector of the target ship, collision points between each of the plurality of vertices constituting the safe navigation area and the own ship; and a collision danger area calculator 306 that connects the plurality of collision points calculated by the collision point calculator 305 to calculate a collision danger area.

3 Claims, 13 Drawing Sheets

(51) Int. Cl.
*B63B 49/00* (2006.01)
*G01C 21/22* (2006.01)
*G01S 13/937* (2020.01)

(56) References Cited

FOREIGN PATENT DOCUMENTS

| | | |
|---|---|---|
| JP | 07-246998 | 9/1995 |
| JP | 07-304496 | 11/1995 |
| JP | 2013107488 A | 6/2013 |
| JP | 2017054215 A | 3/2017 |
| KR | 20090092462 A | 9/2009 |

OTHER PUBLICATIONS

Corresponding PCT application No. PCT/JP2019/011684, International Search Report, dated Jun. 25, 2019. English Translation.
Corresponding PCT application No. PCT/JP2019/011684, Written Opinion, dated Jun. 25, 2019.

* cited by examiner $E_1$:One collision point $E_1, E_6$:One collision point

E₁:No collision point
E₂:One collision point

E₁,E₅:No collision point $E_1$:No collision point
$E_5$:One collision point

SHIP NAVIGATION ASSISTING DEVICE

TECHNICAL FIELD

The present invention relates to a navigation assisting device for a ship, which displays a collision danger area between own ship and a target ship to assist the navigation of the ship.

BACKGROUND ART

Typically, a ship is provided with a radar device for detecting other ships and a radar display for showing a video signal from the radar device on a display to thereby avoid collision with other ships. The display of radar device has an ARPA (Automatic Radar Plotting Aids) function. The function includes: extracting a target ship from a radar image and tracking it; calculating and displaying the motion vector of the target ship; calculating DCPA (Distance of Closest Point of Approach) and TCPA (Time to Closest Point of Approach) between own ship and the target ship; and issuing an alarm when the value of the DCPA or TCPA becomes smaller than a reference value. The ARPA is currently referred to as TT (Target Tracking) and is provided as one function for a ship navigation assisting device including, e.g., the radar display and an ECDIS (Electronic Chart Display and Information System).

The above TT function allows determination of the degree of danger of collision with the target ship when the own ship's course is maintained; however, it is not possible to obtain information indicating what course the ship should take for ensuring safety when it performs avoidance maneuver. To cope with this, there is known a ship navigation assisting device that calculates DAC (Dangerous Area of Collision) indicating an area where there is a danger of collision with other ships (for example, Patent Document 1).

Specifically, this ship navigation assisting device calculates, from the relative position and velocity vector of a target ship and the speed of own ship, vertices of a polygonal safe navigation area set around the own ship and collision points with the target ship, calculates the positions of the own ship when the vertices coincide with the collision points as own ship imaging positions, and calculates a connection relationship obtained by connecting the own ship imaging positions as a collision danger area.

The thus configured ship navigation assisting device provides an accurate collision danger area to ship operators, and thus the ship operators can grasp a dangerous or safe direction without performing trial maneuver. This can easily achieve adequate avoidance maneuver while maintaining a safe navigation distance from other ships.

CITATION LIST

Patent Document

Patent Document 1: JP 07-246998A

DISCLOSURE OF THE INVENTION

Problems to be Solved by the Invention

According to the finding from actual situation survey in marine traffic engineering, the safe navigation area is set to an elliptical shape with its center deviated from own ship, and ship operators perform maneuvering while assuming such a safe navigation area in general. However, according to the above-mentioned conventional ship navigation assisting device, the polygonal safe navigation area set for own ship, based on which the collision danger area is determined, has a shape approximating a perfect circle with its center located on the own ship, i.e., a shape obtained by connecting a plurality of points equidistant from the own ship. Thus, when the safe navigation area is set to a shape not approximating a perfect circle in the conventional ship navigation assisting device, the collision danger area changes according to the orientation of (course) of the own ship since symmetry is not established for all directions around the own ship. This reduces reliability of the collision danger area based on which ship operators can grasp a dangerous or safe direction without performing trial maneuvers.

That is, according to the conventional ship navigation assisting device, it is necessary to calculate a collision danger area based on a safe navigation area approximating a perfect circle in order to ensure the reliability of the collision danger area. Thus, the freedom degree of the shape of the safe navigation area to be set for a ship is low.

The present invention has been made to solve the above problem, and the object thereof is to provide a ship navigation assisting device capable of calculating a collision danger area with high reliability while enhancing the freedom degree of the shape of a safe navigation area to be set for a ship.

Means for Solving the Problems

To solve the above problem, according to the present embodiment, there is provided a ship navigation assisting device that calculates a collision danger area between own ship and a target ship to assist the navigation of the own ship, the device including: an area setter that sets, for the target ship, a polygonal safe navigation area defined by a plurality of vertices and surrounding the target ship; a collision point calculator that calculates, based on a speed of the own ship, a relative position between the own ship and the target ship, and a velocity vector of the target ship, collision points between each of the plurality of vertices constituting the safe navigation area and the own ship; and a collision danger area calculator that connects the plurality of collision points calculated by the collision point calculator to calculate the collision danger area.

Advantageous Effects of the Invention

According to the present invention, it is possible to calculate a collision danger area having high reliability while enhancing the freedom degree of the shape of a safe navigation area set for a ship.

BEST MODE FOR CARRYING OUT THE INVENTION

Hereinafter, an embodiment of the present invention will be described with reference to the accompanying drawings.
Configuration of Ship Navigation Assisting Device)

Figure 1:
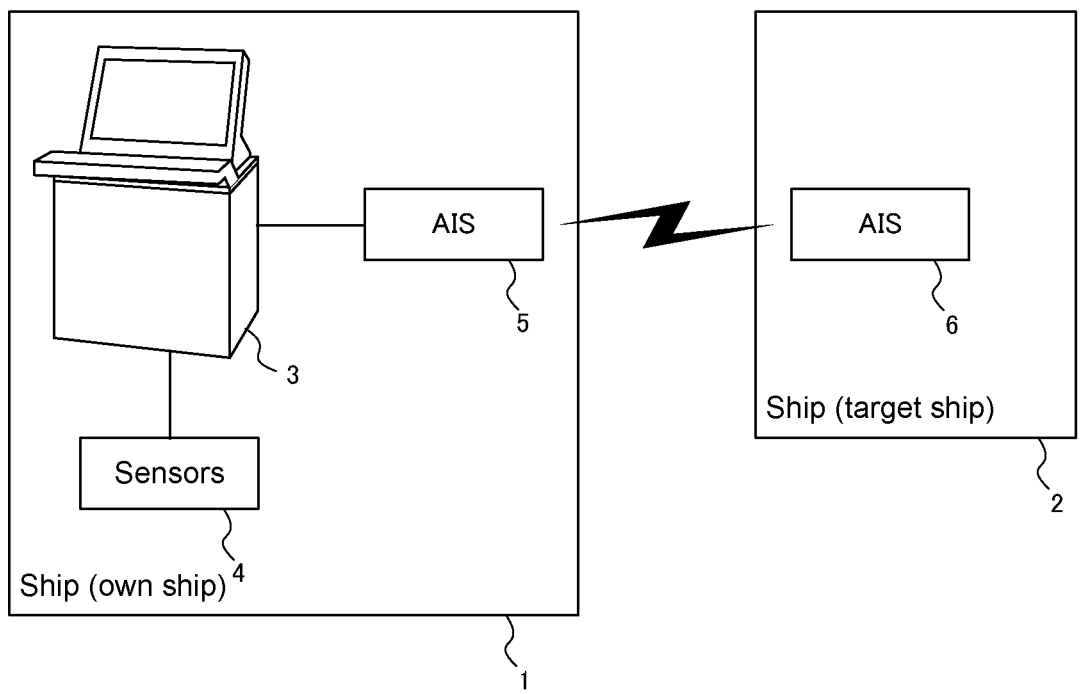
FIG. 1 is a view illustrating the entire configuration of a system including a ship navigation assisting device according to the present embodiment.
Figure 2:
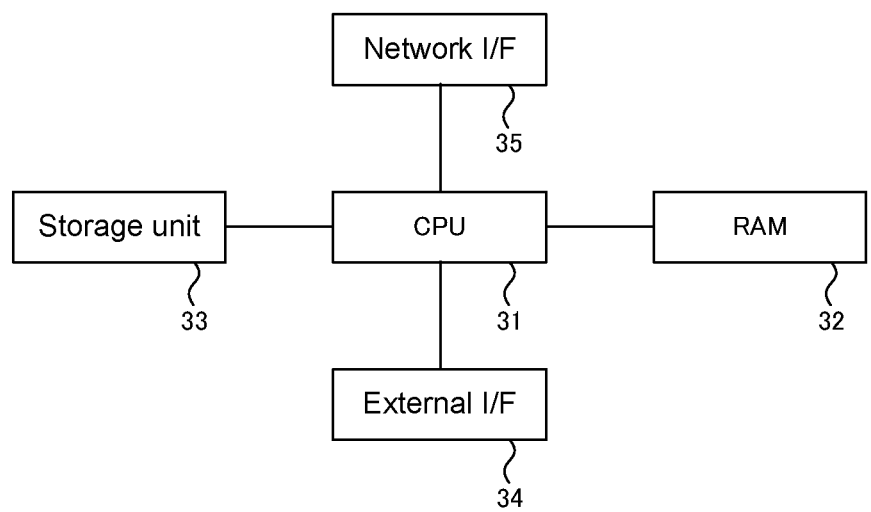
FIG. 2 is a block diagram illustrating the hardware configuration of the ship navigation assisting device.
Figure 3:
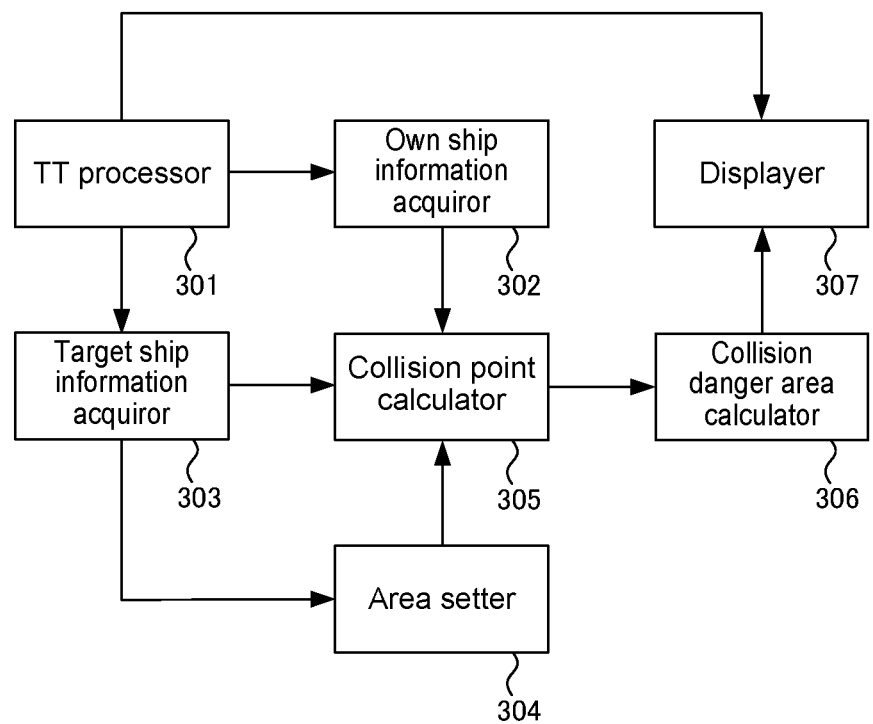
FIG. 3 is a block diagram illustrating the functional configuration of the ship navigation assisting device.

The configuration of a ship navigation assisting device according to the present embodiment will be described. FIG. 1 is a view illustrating the entire configuration of a system including the ship navigation assisting device according to the present embodiment. FIG. 2 is a block diagram illustrating the hardware configuration of the ship navigation assisting device. FIG. 3 is a block diagram illustrating the functional configuration of the ship navigation assisting device.

As illustrated in FIG. 1, the system according to the present embodiment includes a ship navigation assisting device 3, sensors 4, and an AIS (Automatic Identification System) 5 installed on board a ship 1 as own ship, and an AIS 6 installed on board a target ship 2 as other ships.

The sensors 4 include a speed log for detecting the log speed of the ship 1, a gyro compass for detecting the heading of the ship 1, and a GNSS (Global Navigation Satellite System) sensor for detecting the position of the ship 1 and a course and speed over the ground from a GNSS such as GPS. The AIS 5 and AIS 6 are each a device capable of data transmission and reception and each receive ship data from the AIS installed on board other ships. The ship data includes Maritime Mobile Service Identity code, ship name, ship type, draft, destination, estimated time of arrival, navigation status, longitude, latitude, speed, course, ship length, ship width, heading, and other information items.

The ship navigation assisting device 3 is, for example, a radar display or an electronic navigational chart system and includes, as hardware, a CPU (Central Processing Unit) 31, a RAM (Random Access Memory) 32, a storage unit 33, an external I/F (Interface) 34, and a network I/F 35, as illustrated in FIG. 2. The CPU 31 and RAM 32 execute various functions in cooperation with each other, and the storage unit 33 stores various data used for the processing executed by the various functions. The external I/F 34 performs data input/output with respect to an output device such as a display, an input device such as a mouse or a keyboard, and an input/output device such as a touch panel. The network I/F 35 is an interface for performing communication with other devices (sensors 4 and AIS 5 in the present embodiment).

The ship navigation assisting device 3 includes, as functional configurations, a TT (Target Tracking) processor 301, own ship information acquiror 302, a target ship information acquiror 303, an area setter 304, a collision point calculator 305, a collision danger area calculator 306, and a displayer 307.

The TT processor 301 automatically detects the target ship 2 from a radar video signal transmitted from a not-shown radar device and tracks it, calculates the position coordinates and velocity vector of the target ship 2, and calculates the position coordinates and velocity vector of the own ship 1 from measurement data concerning the own ship 1 which is measured by the sensors 4.

Own ship information acquiror 302 acquires the position coordinates and velocity vector of the own ship 1 calculated by the TT processor 301 as own ship information. The target ship information acquiror 303 acquires, as target ship information, the position coordinates and velocity vector of the target ship 2 calculated by the TT processor 301 and ship data of the target ship 2 received by the AIS 5.

The area setter 304 sets a safe navigation area with respect to the target ship 2 based on the target ship information acquired by the target ship information acquiror 303. The safe navigation area has an optionally determined two-dimensional shape surrounding the position coordinates of the target and is a polygonal shape obtained by connecting a plurality of vertices.

The collision point calculator 305 calculates, based on the relative position and velocity vector of the target ship 2 with respect to the own ship 1 and the speed of the own ship 1 which are obtained from the own ship information and target ship information, collision points between the own ship 1 and the vertices of the safe navigation areas set for target ship 2. The collision danger area calculator 306 connects the collision points calculated by the collision point calculator 305 and determines the connection relationship as a collision danger area.

The displayer 307 displays, on a display connected to the ship navigation assisting device 3, a wake obtained by plotting the position coordinates of the target ship 2 and the velocity vector of the target ship 2 calculated by the TT processor 301, and the position coordinates and velocity vector of the own ship 1 calculated by the TT processor 301. Further, the displayer 307 displays the collision danger area calculated by the collision danger area calculator 306 on the display.
(Operation of Ship Navigation Assisting Device)

Figure 4:
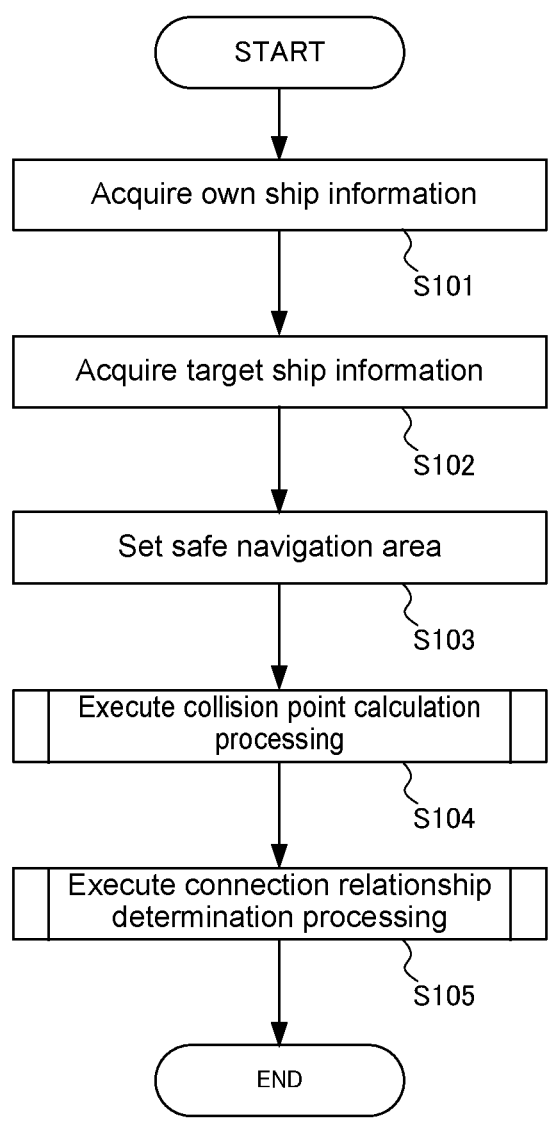
FIG. 4 is a flowchart illustrating the operation of the ship navigation assisting device.
Figure 5:
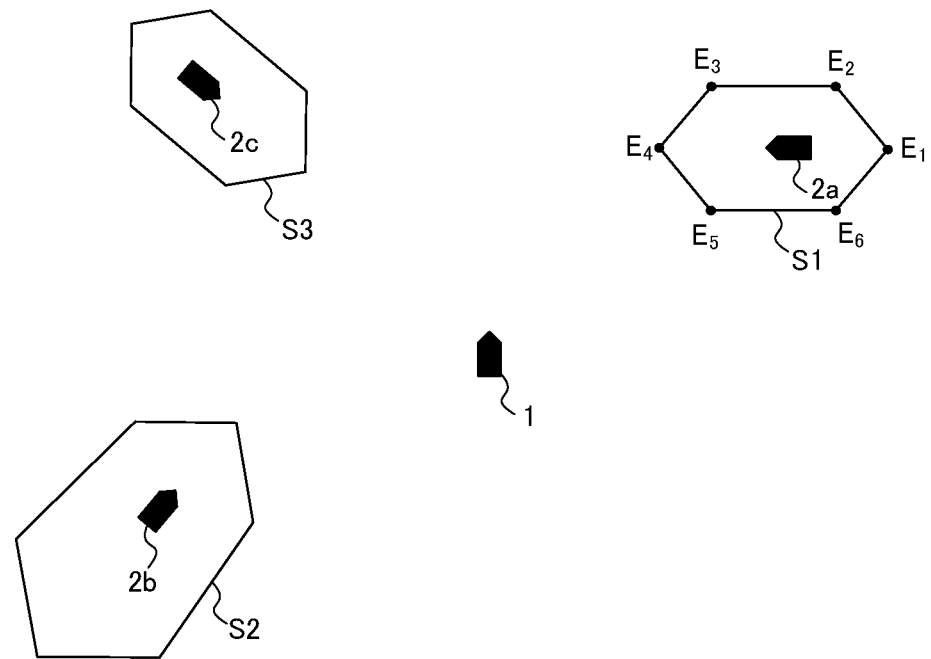
FIG. 5 is a schematic view illustrating a safe navigation area set for a target ship.

The following describes the operation of the ship navigation assisting device concerning the calculation of the collision danger area. FIG. 4 is a flowchart illustrating the operation of the ship navigation assisting device. FIG. 5 is a schematic view illustrating the safe navigation area set for the target ship. In FIG. 4, it is assumed that the TT processor previously calculates the position coordinates and velocity vector of each of the target ship and that the AIS receives the ship data of the target ship.

As illustrated in FIG. 4, the own ship information acquiror 302 acquires the own ship information including the position coordinates and velocity vector of the own ship 1 (S101), and the target ship information acquiror 303 acquires, as the target ship information, the position coordinates, velocity vector, and ship data of the target ship 2 (S102). Then, the area setter 304 sets the safe navigation area with respect to the target ship 2 based on the target ship information acquired by the target ship information acquiror 303 (S103).

Here, the safe navigation area will be described. As illustrated in FIG. 5, the safe navigation area is set for each of the target ships 2 existing within a predetermined distance from the own ship 1. Specifically, in the example of FIG. 5, safe navigation areas S1, S2, and S3 are set for target ships 2a, 2b, and 2c, respectively. Although the safe navigation areas S1 to S3 are each a hexagon with six vertices E1 to E6, they are not the same hexagon. Further, the safe navigation area is preferably made into a polygonal shape approximating an elliptical shape with a long diameter in the bow and stern direction of the target ship 2 and a short diameter in the abeam direction and is hexagonal in shape in the present embodiment for the descriptive convenience. Here, in the case of the target ships 2a and 2c, which are typical ships, the center position of the safe navigation area is offset forward in the travel direction from the position coordinates of each ship. Generally, the astern power of a ship is lower as compared to the ahead power thereof, so that making wider the forward side in the travel direction of the safe navigation area with respect to the ship as compared to the rearward side in the travel direction causes no adverse effect on ship navigation and is in line with the actual situation of marine traffic.

The area setter 304 changes the shape of the safe navigation area based on the target ship information of the target ship 2. Specifically, the area setter 304 sets the shape and size of the safe navigation area, the center position of the safe navigation area with respect to the position coordinates of the target ship 2 based on the ship type, navigation status, ship length ship width, and the like of the target ship information. For example, when the ship type of the target ship 2 is a fishing vessel, the center position of the safe navigation area is offset rearward in the travel direction as in the safe navigation area S2 set for the target ship 2b of FIG. 5. This makes it possible to make the safe navigation area be customized for a fishing net provided rearward of the ship during fishing operation. Further, when the ship type of the target ship 2 is a pusher or a tugboat, the center position of the safe navigation area is offset forward or rearward in the traveling direction of the target ship 2. This makes it possible to make the safe navigation area be customized for a ship to be towed. The area setter 304 can set the safe navigation area of any shape not only for ships but also for stationary targets. In this case, by displaying the safe navigation area on the display by means of the displayer 307, it can be used as No-Go Area (restricted area) or Navline (navigation memo).

After the safe navigation area is set, the collision point calculator 305 executes collision point calculation processing of calculating the collision points between the vertices of the safe navigation area and the own ship 1 (S104). Then, the collision danger area calculator 306 executes connection relationship determination processing of determining the connection relationship between the collision points calculated through the above collision point calculation processing (S105). Details of the collision point calculation processing and connection relationship determination processing will be described later.

(Calculation Method for Collision Points)

Figure 6:
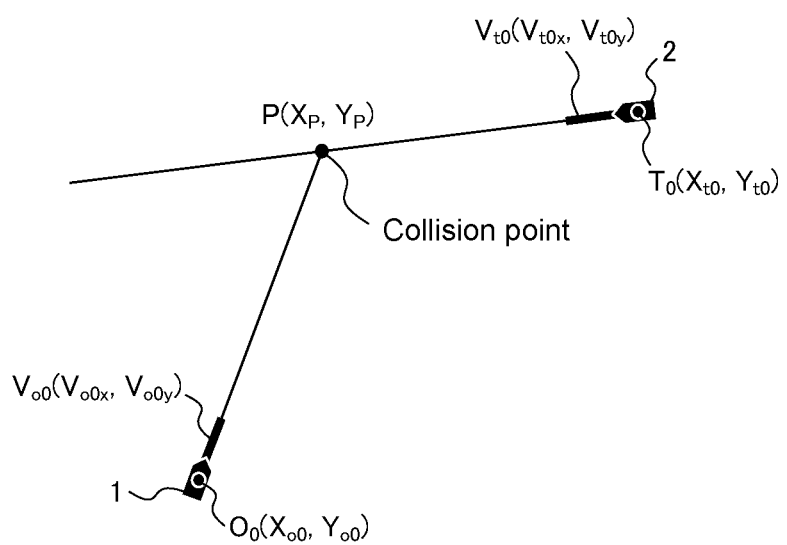
FIG. 6 is a schematic view illustrating a collision point between own and target ships.
Figure 7:
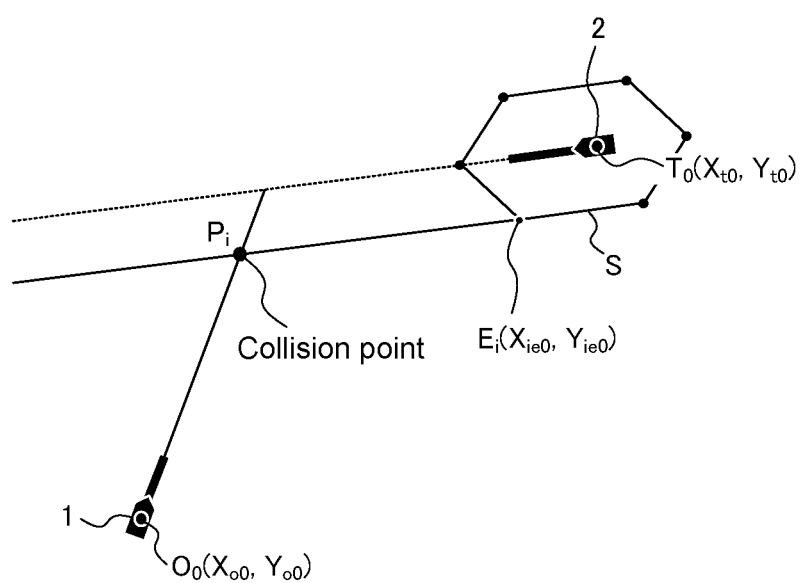
FIG. 7 is a schematic view illustrating the collision point between the own ship and the vertices of the safe navigation area set for the target ship.

The following describes a calculation method for the collision points. For easy understanding of the present embodiment, a calculation method for a collision point between the own ship and the target ship will be described prior to a description of the collision points between the own ship and vertices of the safe navigation area set for the target ship. FIG. 6 is a schematic view illustrating the collision point between the own ship and the target ship. FIG. 7 is a schematic view illustrating the collision point between the own ship and the vertices of the safe navigation area set for the target ship.

In FIG. 6, $O_0(X_{o0}, Y_{o0})$ denotes the current position of the own ship 1 on X-Y coordinates, and $T_0(X_{t0}, Y_{t0})$ denotes the current position of the target ship 2. Further, $V_{o0}(V_{o0x}, V_{o0y})$ denotes the current velocity vector of the own ship 1 on a certain course, and $V_{t0}(V_{t0x}, V_{t0y})$ denotes the current velocity vector of the target ship 2 on a certain course.

It is assumed here that the target ship 2 travels without changing its course and speed and that the own ship travels while changing only its course. Own ship position $O(t)(X_o(t), Y_o(t))$ and a target ship position $T(t)(X_t(t), Y_t(t))$ are represented by the following equations.

[Numeral 1]

$$O(t): \begin{aligned} X_o(t) &= X_{o0} + V_{o0x} \cdot t \\ Y_o(t) &= Y_{o0} + V_{o0y} \cdot t \end{aligned} \quad (1)$$

$$T(t): \begin{aligned} X_t(t) &= X_{t0} + V_{t0x} \cdot t \\ Y_t(t) &= Y_{t0} + V_{t0y} \cdot t \end{aligned} \quad (2)$$

A collision point $P(X_p, Y_p)$ between the own ship 1 and the target ship 2 is a point at which O(t) and T(t) coincides with each other, so that the velocity vector value of the own ship 1 when the own ship 1 has a collision point with the target ship 2 is represented by the following equation (3) assuming that the right sides of the above equations (1) and (2) are equal for each of X and Y components.

[Numeral 2]

$$V_{o0x} = V_{t0x} + \frac{X_{t0} - X_{o0}}{t} \quad (3)$$

$$V_{o0y} = V_{t0y} + \frac{Y_{t0} - Y_{o0}}{t}$$

A speed $V_o$ of the own ship 1 is an invariant value, so that the following equation (4) is always satisfied.

[Numeral 3]

$$V_{o0x}^2 + V_{o0y}^2 = V_o^2 \quad (4)$$

Then, $(X_{t0} - X_{o0}) = X$, $(Y_{t0} - Y_{o0}) = Y$ is obtained by substituting expression (3) into expression (4), and quadratic equation (5) is solved for t, whereby an arrival time t for the own ship 1 to reach the collision point can be calculated.

[Numeral 4]

$$t = \frac{-(XV_{t0x} + YV_{t0y}) \pm \sqrt{(XV_{t0x} + YV_{t0y})^2 - (V_{t0x}^2 + V_{t0y}^2 - V_0^2)(X^2 + Y^2)}}{V_{t0x}^2 + V_{t0y}^2 - V_o^2} \quad (5)$$

The collision point $P(X_p, Y_p)$ can be calculated by substituting t in equation (5) into equation (2) as the following equation (6).

[Numeral 5]

$$X_p = X_{t0} + \frac{-(XV_{t0x} + YV_{t0y}) \pm \sqrt{(XV_{t0x} + YV_{t0y})^2 - (V_{t0x}^2 + V_{t0y}^2 - V_0^2)(X^2 + Y^2)}}{V_{t0x}^2 + V_{t0y}^2 - V_o^2} \cdot V_{t0x}$$

$$Y_p = Y_{t0} + \frac{-(XV_{t0x} + YV_{t0y}) \pm \sqrt{(XV_{t0x} + YV_{t0y})^2 - (V_{t0x}^2 + V_{t0y}^2 - V_0^2)(X^2 + Y^2)}}{V_{t0x}^2 + V_{t0y}^2 - V_o^2} \cdot V_{t0y} \quad (6)$$

To calculate a collision point $P_i(X_{ip}, Y_{ip})$ (i=1, 2, ..., n) between the own ship 1 and the vertex $E_i(X_{ie0}, Y_{ie0})$ (i=1, 2, ..., n) of the safe navigation area set for the target ship 2, the vertex $E_i(X_{ie0}, Y_{ie0})$ is substituted into the position of the target ship 2 in equation (6) for calculating the collision point between the own ship 1 and the target ship 2 assuming that the safe navigation area does not change with time. In this manner, the collision point is calculated for each of the vertices constituting the safe navigation area.

The number of the collision points to be calculated for each vertex changes depending on the speed ratio between the own ship 1 and the target ship 2 and the relative position between the own ship 1 and each vertex, i.e., depending on the number of solutions that satisfy t>0 in equation (5). Specifically, the number of the collision points for each vertex is classified as follows assuming that the discriminant of the quadratic equation for t obtained by substituting equation (3) into equation (4) is D.

a) In a case where the target ship 2 is lower in speed than the own ship 1, the number of collision point is always one.
b) In a case where the target ship 2 and the own ship 1 are equal in speed, one collision point exists when $X_i V_{t0x} + Y_i V_{t0y} < 0$ is satisfied and no collision point exists when $X_i V_{t0x} + Y_i V_{t0y} \geq 0$ is satisfied.
c) In a case where the target ship 2 speed is faster than the own ship 1, two collision points exist when both D>0 and $X_i V_{t0x} + Y_i V_{t0y} < 0$ are satisfied, one collision point exists when both D=0 and $X_i V_{t0x} + Y_i V_{t0y} < 0$ are satisfied, and no collision point exists when D<0 is satisfied.

In the above classification, D, $X_i$, and $Y_i$ satisfy the following relationships.

[Numeral 6]

$$D = 4\{(X_i V_{t0x} + Y_i V_{t0y})^2 - (V_{t0x}^2 + V_{t0y}^2 - V_o^2) - (X_i^2 + Y_i^2)\} \quad (7)$$

[Numeral 7]

$$X_i = X_{ie0} - X_{o0}$$

$$Y_i = Y_{ie0} - Y_{o0} \quad (8)$$

For intuitively understanding the number of the collision points, the above classification can be interpreted as follows. In the case of the classification a), since the own ship 1 speed is faster, there should exist a course on which the own ship 1 will catch up with the target ship 2. In the case where no collision point exists in the classification b), since the target ship 2 and the own ship 1 are equal in speed, the own ship 1 cannot catch up with the target ship 2 when the target ship 2 travels away from the own ship 1. In the case where two collision points exists in the classification c), since the target ship 2 speed is faster, there are two possibilities of collision: one is a case where the target ship 2 collides with the own ship 1 from the front thereof; and the other is a case where the target ship 2 collides with the own ship 1 from the back thereof.

(Collision Point Calculation Processing)

Figure 8:
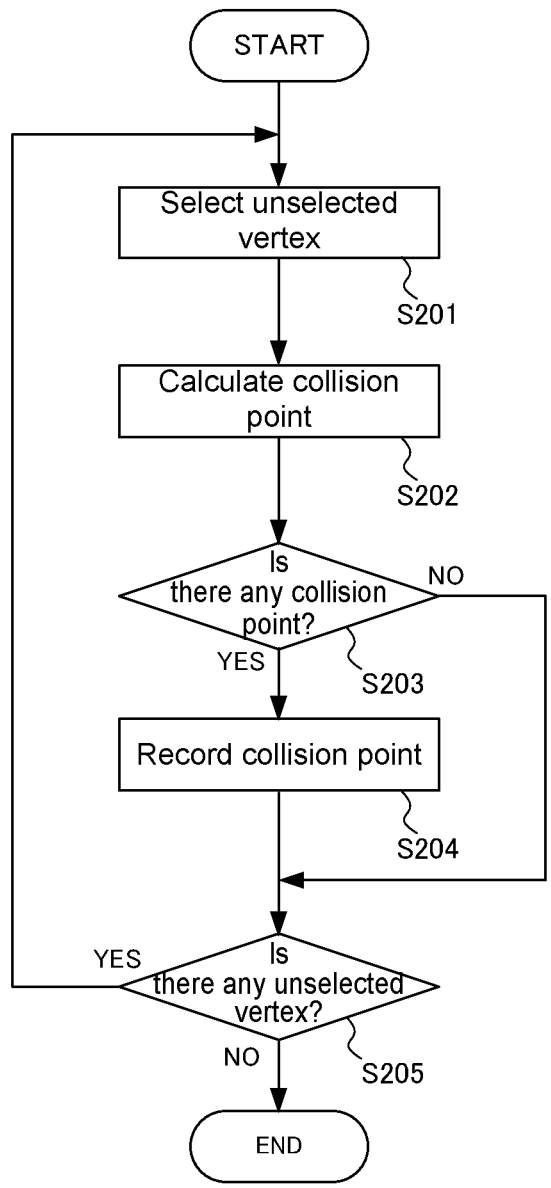
FIG. 8 is a flowchart illustrating the operation of collision point calculation processing.

The following describes the collision point calculation processing. FIG. 8 is a flowchart illustrating the operation of the collision point calculation processing.

The collision point calculator 305 selects one unselected vertex from among the plurality of vertices constituting the safe navigation area set for the target ship 2 (S201). Then, for the selected vertex, the collision point calculator 305 calculates the collision point with the own ship 1 using the above-described calculation method (S202) and determines whether there exists any collision point as a collision point calculation result (S203).

When there exists any collision point (Yes in S203), the collision point calculator 305 records the calculated collision point in the storage unit 33 in association with the vertex being selected and arrival time for the own ship 1 to reach the calculated collision point (S204) and then determines whether there is any unselected vertex among the plurality of vertices constituting the safe navigation area set for the target ship 2 (S205).

When there is no unselected vertex (NO in S205), the collision point calculator 305 ends the collision point calculation processing.

On the other hand, when there is any unselected vertex (YES in S205), the collision point calculator 305 selects one unselected vertex again (S201).

When there is no collision point in step S203 (NO in S203), the collision point calculator 305 determines whether there is any unselected vertex (S205).

(Collision Point Connection Method)

Figure 9:
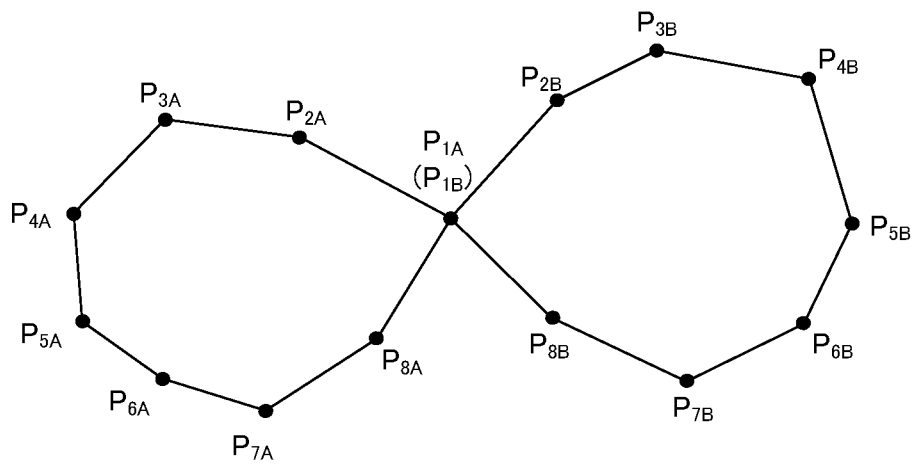
FIG. 9 is a schematic view illustrating two collision danger areas contacting each other in a case where only one vertex has one collision point.
Figure 10:
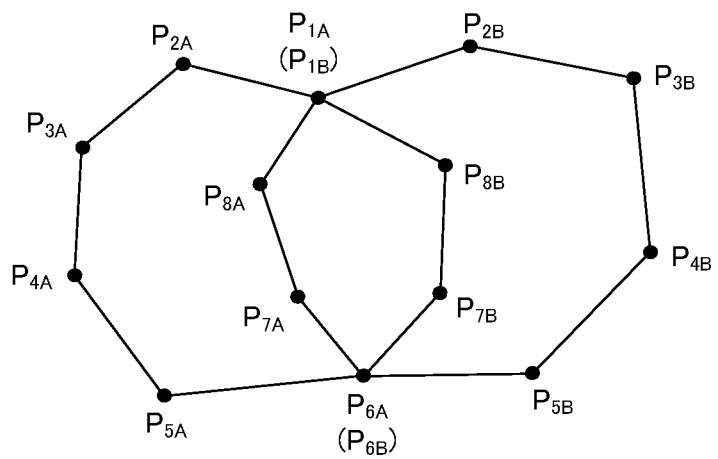
FIG. 10 is a schematic view illustrating two collision danger areas contacting each other in a case where two vertices each have one collision point.
Figure 11:
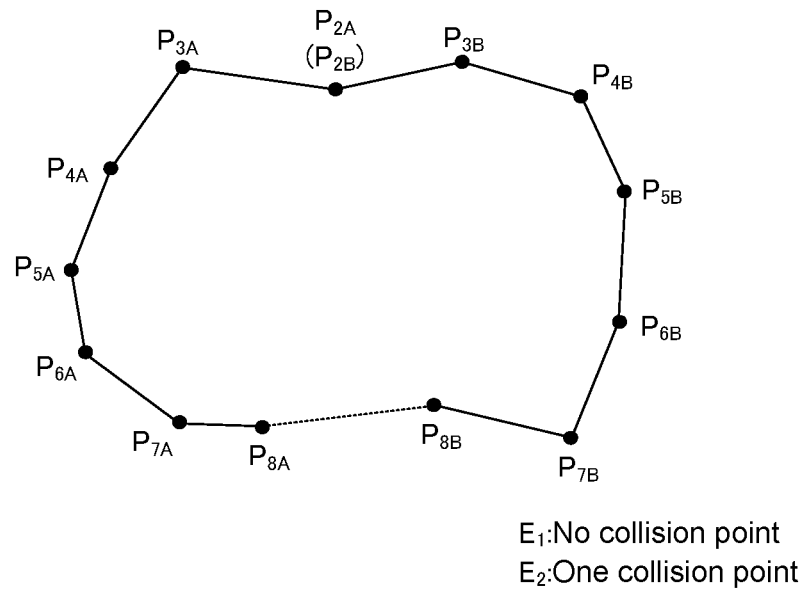
FIG. 11 is a schematic view illustrating two collision danger areas overlapping each other in a case where only one vertex has one collision point and where vertices adjacent to the one vertex having one collision point have no collision point.
Figure 12:
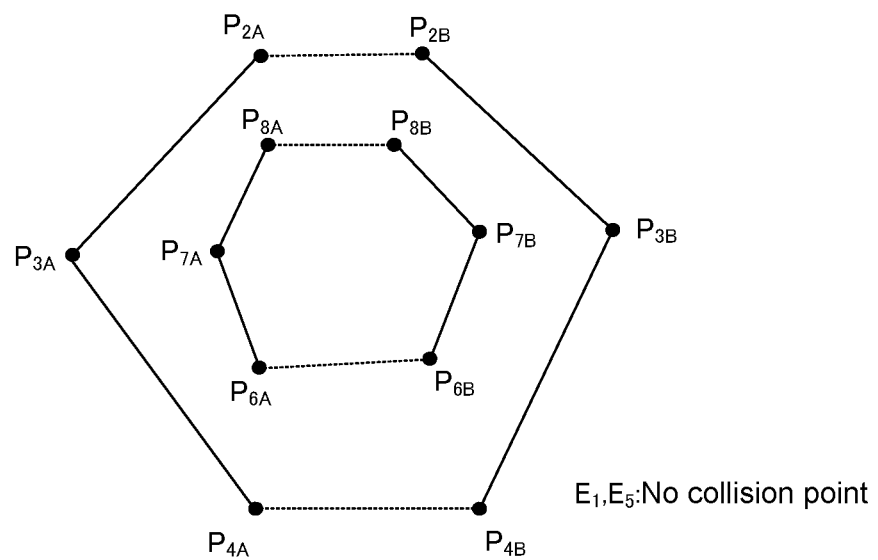
FIG. 12 is a schematic view illustrating two collision danger areas overlapping each other in a case where two vertices have no collision point.
Figure 13:
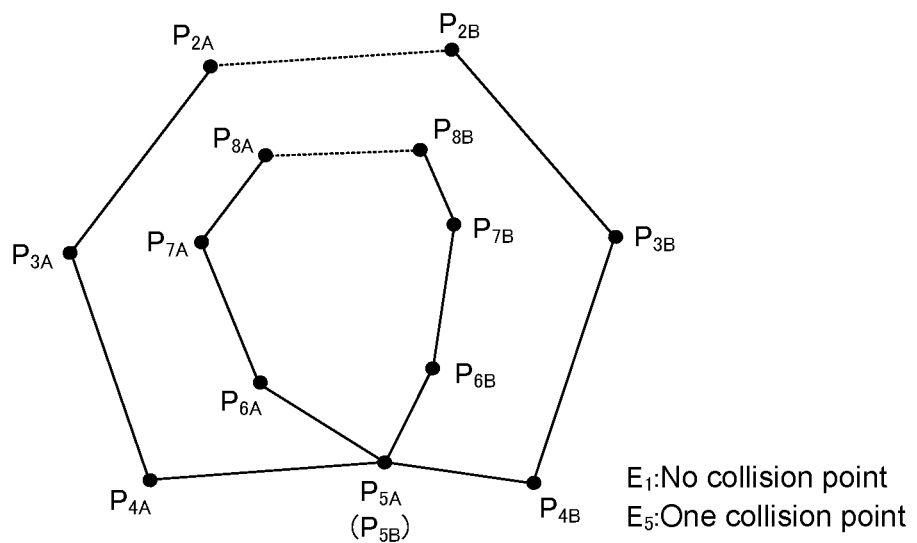
FIG. 13 is a schematic view illustrating two collision danger areas overlapping each other in a case where a case where only one vertex has one collision point and where vertices not adjacent to the one vertex having one collision point have no collision point.

The following describes a collision point connection method. FIGS. 9 and 10 are each a schematic view illustrating two collision danger areas contacting each other. FIG. 9 illustrates a case where only one vertex has one collision point, and FIG. 10 illustrates a case where two vertices each have one collision point. FIGS. 11 to 13 each illustrate two collision danger areas overlapping each other. FIG. 11 illustrates a case where only one vertex has one collision point and where vertices adjacent to the one vertex having one collision point have no collision point, FIG. 12 illustrates a case where two vertices have no collision point, and FIG. 13 illustrates a case where only one vertex has one collision point and where vertices not adjacent to the one vertex having one collision point have no collision point.

In the connection of the collision points, when a first vertex of the safe navigation area adjacent to a second vertex has a collision point, the first and second vertices are connected by a line segment. The number of the collision danger areas changes depending on the number of the collision points calculated for each vertex and is classified as follows.
- a) In a case where the target ship 2 is lower in speed than the own ship 1, the number of the collision danger areas is necessarily one.
- b) In a case where the target ship 2 and the own ship 1 are equal in speed, no collision danger area exists, or one collision danger area exists.
- c) In a case where the target ship 2 speed is faster than the own ship 1, no collision danger area exists, or one or two collision danger areas exist.

That is, the connection of the collision points is determined as follows corresponding to the above classifications a) to c) depending on the speed ratio between the target ship 2 and the own ship 1 and the state of occurrence of the collision point P calculated for each vertex of the safe navigation area.

a, b) a Case where the Speed of the Target Ship is Equal to or Lower than the Speed of the Own Ship Only when the adjacent vertices of the safe navigation area have collision points, the collision points are connected by a line segment. If all vertices have a collision point, the collision danger area obtained is a closed area, but if there is a vertex without a collision point, the collision danger area becomes an open area since the collision points calculated for two vertices adjacent to the vertex without a collision point are not connected to each other.

c) Case where the Target Ship Speed is Faster than the Speed of the Own Ship

In this case, the following three situations are considered according to the number of collision points at each vertex:
- c1) Two collision danger areas are separated from each other;
- c2) Two collision danger areas contact each other; and
- c3) Two collision danger areas overlap each other and are recognized as one collision danger area.

The situation of each of the above c1) to c3) will be described in detail.

c1) Case where Two Collision Danger Areas are Separated from Each Other

When there are two collision points at each vertex of the safe navigation area, the arrival times to reach the two collision points are compared for each vertex, and the collision points are classified into a group having a short arrival time and a group having a long arrival time. Then, the collision points between the adjacent vertices are connected by line segments for each group. As a result, two separate closed spaces are formed. The length of the arrival time corresponds to the solution when the numerator in the equation (5) is positive and the solution when the numerator therein is negative.

c2) Case where Two Collision Danger Areas Contact Each Other

When there is a vertex having one collision point among the vertices of the safe navigation area, and all other vertices each have two collision points, the arrival times to reach the two collision points are compared for each vertex having two collision points, and the collision points are classified into a group having a short arrival time and a group having a long arrival time. Then, the collision points between the adjacent vertices are connected byline segments for each group. At this time, vertices having only one collision point are regarded as belonging to the both groups and connected to the collision points of the adjacent vertices belonging to the both groups.

In this case, the number of vertices having one collision point in principle is two at the maximum. FIG. 9 illustrates a specific example, in which only a vertex E1 has one collision point. Collision points $P_{iA}$, $P_{iB}$ ($i=1, \ldots, 8$) represent the collision point of the vertex $E_i$ ($i=1, \ldots, 8$). The subscript A represents the group having a short arrival time, and the subscript B represents the group having a long arrival time. When the collision point $P_1$ of the vertex $E_1$ is regarded as belonging to the both groups and is connected to the collision points corresponding to the adjacent vertices, four collision points ($P_{2A}$, $P_{8A}/P_{2B}$, $P_{8B}$) and one collision point $P_{1A}$ ($=P_{1B}$) are connected to form two closed areas contacting each other at one collision point $P_{1A}$ ($=P_{1B}$).

FIG. 10 illustrates a case where two vertices each have one collision point. In FIG. 10, a vertex $E_1$ and a vertex $E_6$ each have one collision point. A collision point $P_1$ of the vertex $E_1$ and a collision point $P_6$ of the vertex $E_6$ are regarded as belonging to the both group and each connected to the collision points corresponding to the adjacent vertices, four collision points ($P_{2A}$, $P_{8A}/P_{2B}$, $P_{8B}$) and one collision point $P_{1A}$ ($=P_{1B}$) are connected, and four collision points ($P_{5A}$, $P_{7A}/P_{5B}$, $P_{7B}$) and one collision point $P_{6A}$ ($=P_{6B}$) are connected to form two closed areas contacting each other at two collision points $P_{1A}$ ($=P_{1B}$) and $P_{6A}$ ($=P_{6B}$).

c3) Case where Two Collision Danger Areas Overlap Each Other

In cases other than the above c1) and c2), the two collision danger areas overlap each other and are viewed as one collision danger area. In such a case, when there is any of the vertices of the safe navigation area at which no collision point exists, the arrival times to reach the two collision points are compared for each vertex having two collision points, and the collision points are classified into a group having a short arrival time and a group having a long arrival time. Then, the collision points between the adjacent vertices are connected by line segments for each group. At this time, vertices having only one collision point are regarded as belonging to the both groups and connected to the collision points of the adjacent vertices belonging to the both groups.

In this case, when one of two vertices adjacent to a vertex having only one collision point has no collision point, two collision points of the other vertex are connected together. FIG. 11 illustrates a specific example. In FIG. 11, only a vertex $E_1$ has no collision point, and only a vertex $E_2$ of the vertices ($E_2$ and $E_8$) adjacent to the vertex E1 has one collision point. One collision point $P_{2A}$ ($=P_{2B}$) of the vertex $E_2$ is regarded as belonging to the both groups and is thus connected to collision points $P_{3A}$ and $P_{3B}$ of both groups that the adjacent vertex $E_3$ has. Further, collision points $P_{8A}$ and $P_{8B}$ have no adjacent collision point other than the collision points $P_{7A}$ and $P_{7B}$, respectively, so that the collision points $P_{8A}$ and $P_{8B}$ are connected as denoted by the dotted line in FIG. 11.

Further, also when two collision danger areas overlap each other, and two vertices have no collision point, two collision points of each of four vertices adjacent to the vertices having no collision point are connected together. FIG. 12 illustrates a specific example. In FIG. 12, vertices $E_1$ and $E_5$ have no collision point, and all other vertices each have a collision point. In this case, as denoted by the dotted lines in FIG. 12, the collision point $P_{2A}$ is connected to the collision point $P_{2B}$, the collision point $P_{4A}$ is connected to the collision point $P_{4B}$, the collision point $P_{6A}$ is connected to the collision point $P_{6B}$, and the collision point $P_{8A}$ is connected to the collision point $P_{8B}$.

Further, also when two collision danger areas overlap each other, only one vertex has one collision point, and vertices that are not adjacent to the vertex having one collision point have no collision point, two collision points of each of two vertices adjacent to the vertices having no collision point are connected together. FIG. 13 illustrates a specific example. In FIG. 13, only vertex $E_1$ has no collision point, and a vertex $E_5$ has one collision point. In this case, one collision point $P_5$ belongs to the both groups and is thus connected to collision points $P_{4A}$, $P_{4B}$, $P_{6A}$, and $P_{6B}$. Further, as denoted by the dotted lines in FIG. 13, for collision points $P_{2A}$, $P_{2B}/P_{8A}$, $P_{8B}$ of the vertices $E_2$ and $E_8$ adjacent to the vertex $E_1$ that has no collision point, the collision point $P_{2A}$ is connected to the collision point $P_{2B}$, and the collision point $P_{8A}$ is connected to the collision point $P_{8B}$. In either case, one closed area is formed.

(Connection Relationship Determination Processing)

Figure 14:
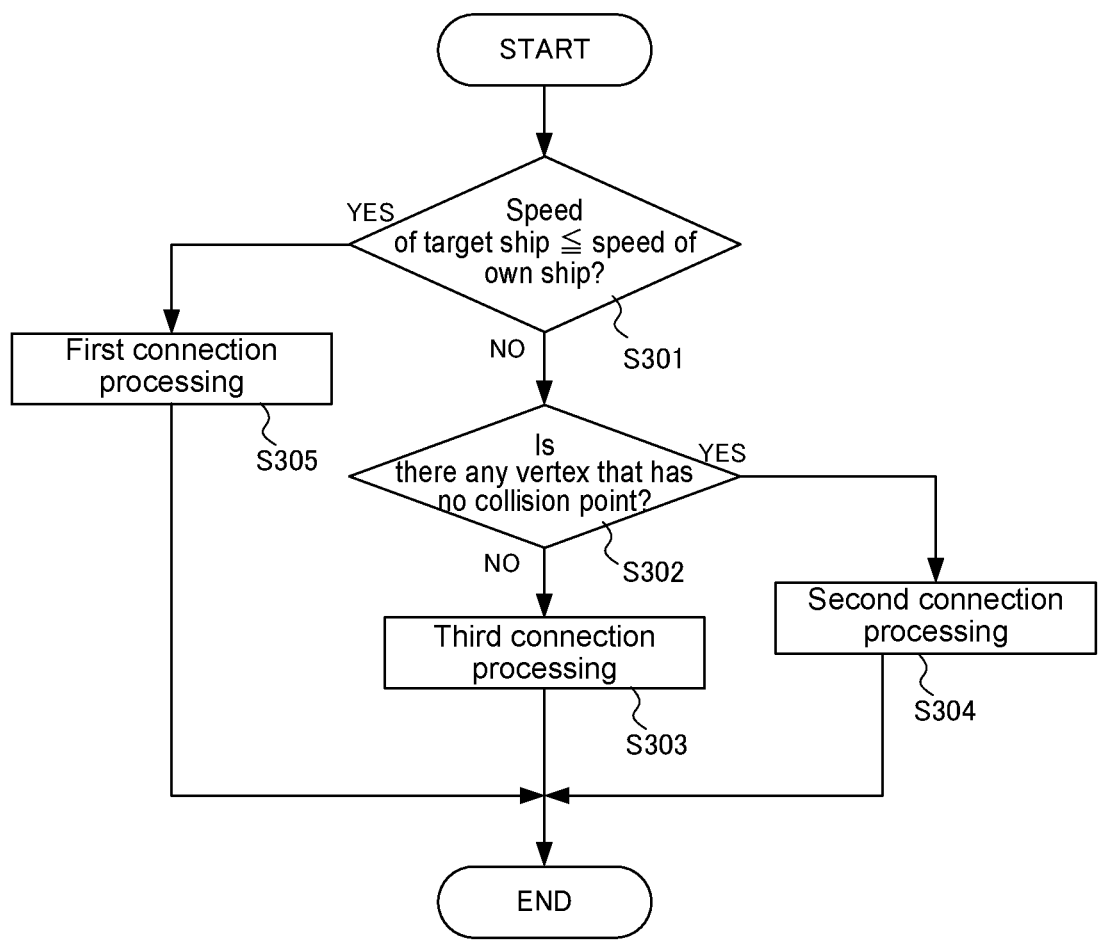
FIG. 14 is a flowchart illustrating connection relationship determination processing.

The following describes the connection relationship determination processing. As described above, the collision point connection method for calculating the collision danger area is classified into a plurality of patterns. Thus, the connection processing is executed after the connection processing corresponding to each pattern is determined through the connection relationship determination processing. FIG. 14 is a flowchart illustrating the connection relationship determination processing.

As illustrated in FIG. 14, the collision danger area calculator 306 determines, based on the own ship information and target ship information concerning the target ship 2, whether the speed of the target ship 2 is equal to or lower than that of the own ship 1 (S301).

When the speed of the target ship 2 is not equal to or lower than the own ship 1 (NO in S301), the collision danger area calculator 306 determines whether there is any vertex having no collision point among the plurality of vertices constituting the safe navigation area set for the target ship 2 (S302). For making this determination, the collision danger area calculator 306 determines the presence/absence of the collision point stored in association with each of the vertices constituting the safe navigation area.

When there is no vertex that has no collision point (NO in S302), the collision danger area calculator 306 executes third connection processing to be described later (S303).

On the other hand, when there is any vertex that has no collision point (YES in S302), the collision danger area calculator 306 executes second connection processing to be described later (S304).

When the speed of the target ship 2 is equal to or lower than that of the own ship 1 (YES in S301), the collision danger area calculator 306 executes first connection processing to be described later (S305).

(First Connection Processing)

Figure 15:
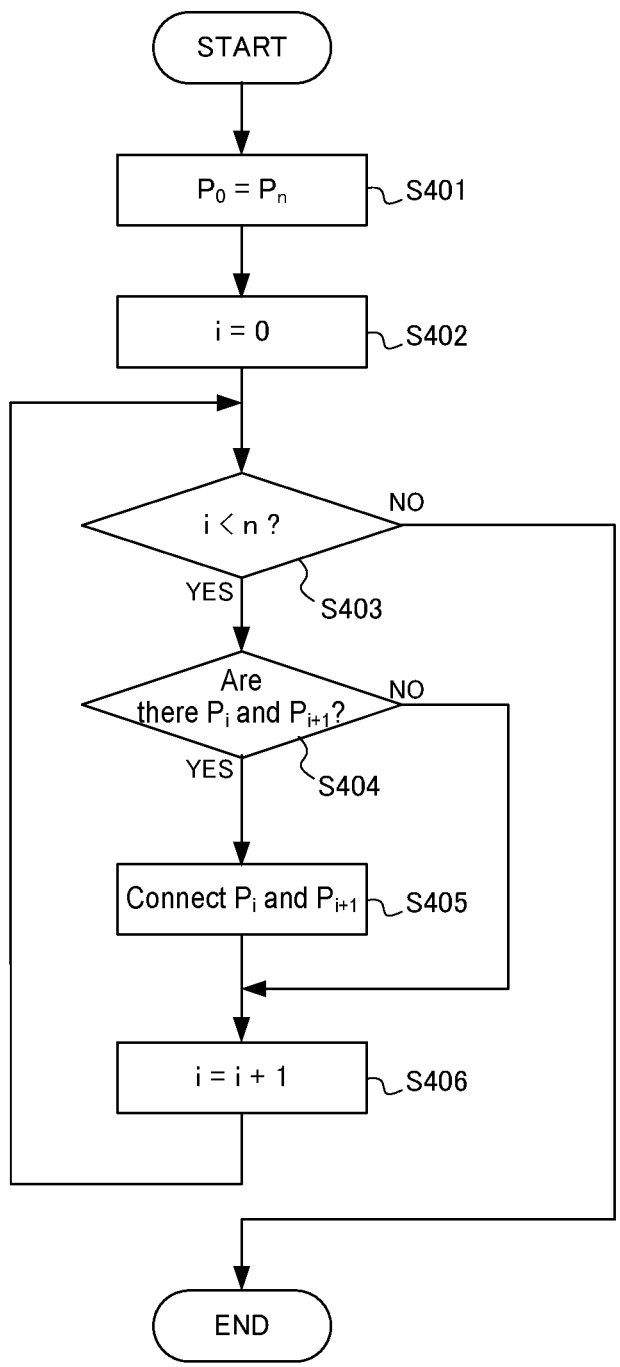
FIG. 15 is a flowchart illustrating the operation of first connection processing.

The following describes the first connection processing. FIG. 15 is a flowchart illustrating the operation of the first connection processing. In this first connection processing, it is assumed that the speed of the target ship is equal to or faster than the speed of the own ship and that there is one area as the collision danger area.

As illustrated in FIG. 15, the collision danger area calculator 306 selects a collision point $P_n$ attached with the largest numeral from among collision points calculated for each of n vertices constituting the safe navigation area, substitutes the collision point $P_n$ into a collision point $P_0$ (S401), and substitutes 0 into a counter variable i (S402). By substituting the collision point $P_n$ into the collision point $P_0$, it is possible to equally treat the collision point $P_n$ with other collision points $P_1$ to $P_{n-1}$ in the subsequent processing. Then, the collision danger area calculator 306 determines whether the counter variable i is less than n (S403).

When the counter variable i is less than n (YES in S403), the collision danger area calculator 306 determines whether there exist a collision point $P_i$ and its subsequent collision point $P_{i+1}$ (S404).

When both the collision point $P_i$ and collision point $P_{i+1}$ exist (YES in S404), the collision danger area calculator 306 connects the collision point $P_i$ and the collision point $P_{i+1}$ to each other (S405), increments the counter variable i (S406), and determines again whether the counter variable i is less than n (S403).

On the other hand, when one of the collision point $P_i$ and collision point $P_{i+1}$ does not exist (NO in S404), the collision danger area calculator 306 increments the counter variable i (S406) and determines again whether the counter variable i is less than n (S403).

When the counter variable i is not less than n in step S403 (NO in S403), the collision danger area calculator 306 ends the first connection processing.

Thus, by connecting a certain collision point and its subsequent collision point, the collision danger area is calculated.

(Second Connection Processing)

Figure 16:
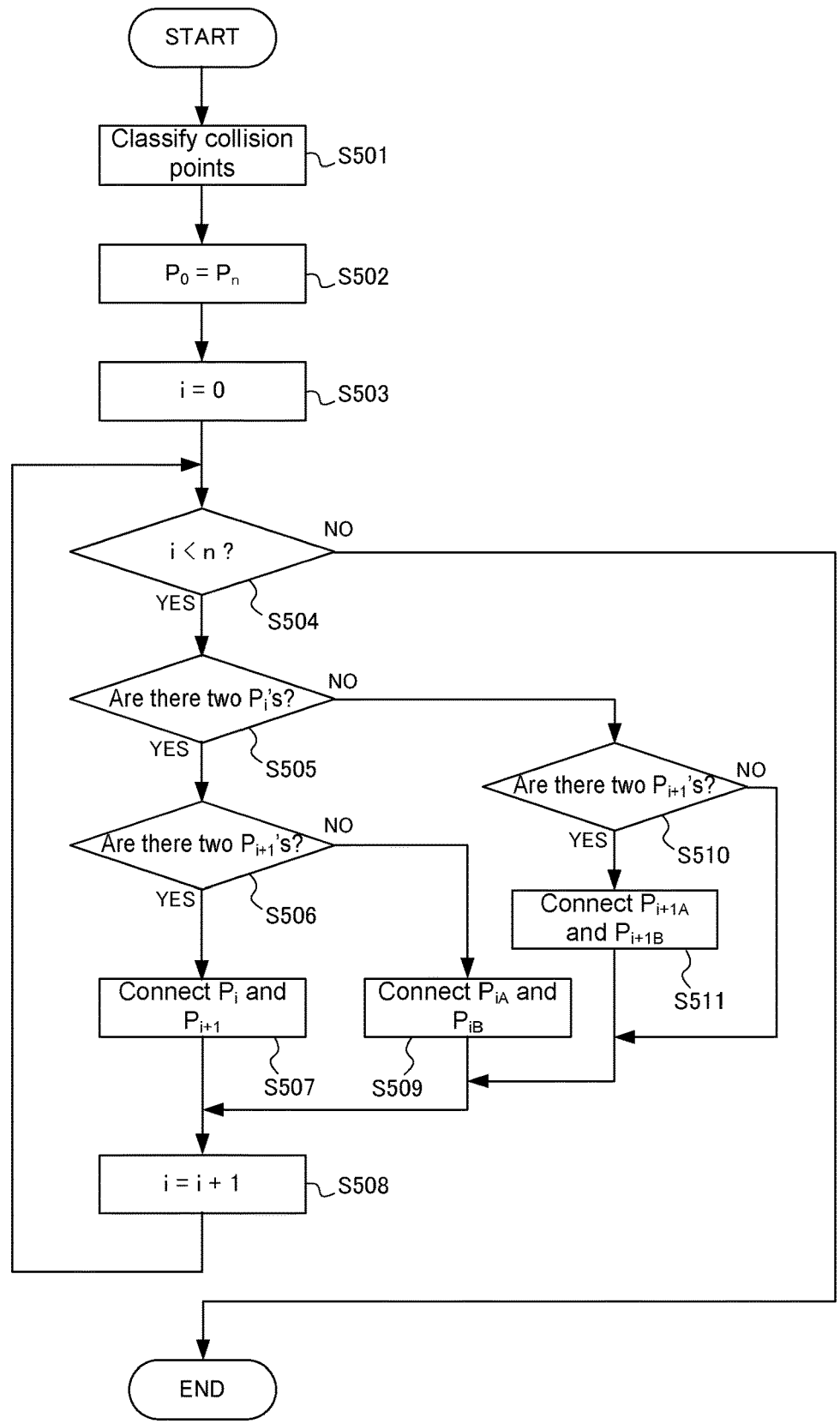
FIG. 16 is a flowchart illustrating the operation of second connection processing.

The following describes the second connection processing. FIG. 16 is a flowchart illustrating the operation of the second connection processing. In this second connection processing, it is assumed that the speed of the target ship is faster than the speed of the own ship, that there exists any vertex that has no collision point among the plurality of vertices constituting the safe navigation area set for the target ship, and that two collision danger areas overlap each other.

As illustrated in FIG. 16, the collision danger area calculator 306 classifies two collision points calculated for each of the plurality of vertices into a group A (subscript$_A$) having a comparatively short arrival time and a group B (subscript$_B$) having a comparatively long arrival time (S501). Then, the collision danger area calculator 306 substitutes the collision point $P_n$ into the collision point $P_0$ (S502), substitutes 0 into the counter variable i (S503), and determines whether the counter variable i is less than n (S504).

When the counter variable i is less than n (YES in S504), the collision danger area calculator 306 determines whether two collision points $P_i$ exist (S505).

When two collision points $P_i$ exist (YES in S505), the collision danger area calculator 306 determines whether two collision points $P_{i+1}$ exist (S506).

When two collision points $P_{i+1}$ exist (YES in S506), the collision danger area calculator 306 connects the collision point $P_i$ and the collision point $P_{i+1}$ in each of the groups A and B (S507), increments i (S508), and determines again whether the counter variable i is less than n (S504).

On the other hand, when there are not two collision points $P_{i+1}$ (No in S506), the collision danger area calculator 306 connects the collision points $P_{iA}$ and $P_{iB}$ (S509), and increments i (S508).

When there are not two collision points $P_i$ in step S505 (NO in S505), the collision danger area calculator 306 determines whether two collision points $P_{i+1}$ exist (S510).

When two collision points $P_{i+1}$ exist (YES in S510), the collision danger area calculator 306 connects collision points $P_{i+1A}$ and $P_{i+1B}$ (S511) together and increments i (S508).

On the other hand, when there are not two collision points $P_{i+1}$ (NO in S510), the collision danger area calculator 306 increments the i (S508).

When the counter variable is not less than n in step S504 (NO in S504), the collision danger area calculator 306 ends the second connection processing.

Thus, when two collision points exist for each of a certain vertex and its subsequent vertex, the two collision points are connected together in each group to calculate the collision danger area; otherwise, two collision points of a certain vertex, or two collision points of its subsequent vertex are connected together to calculate the collision danger area.

(Third Connection Processing)

Figure 17:
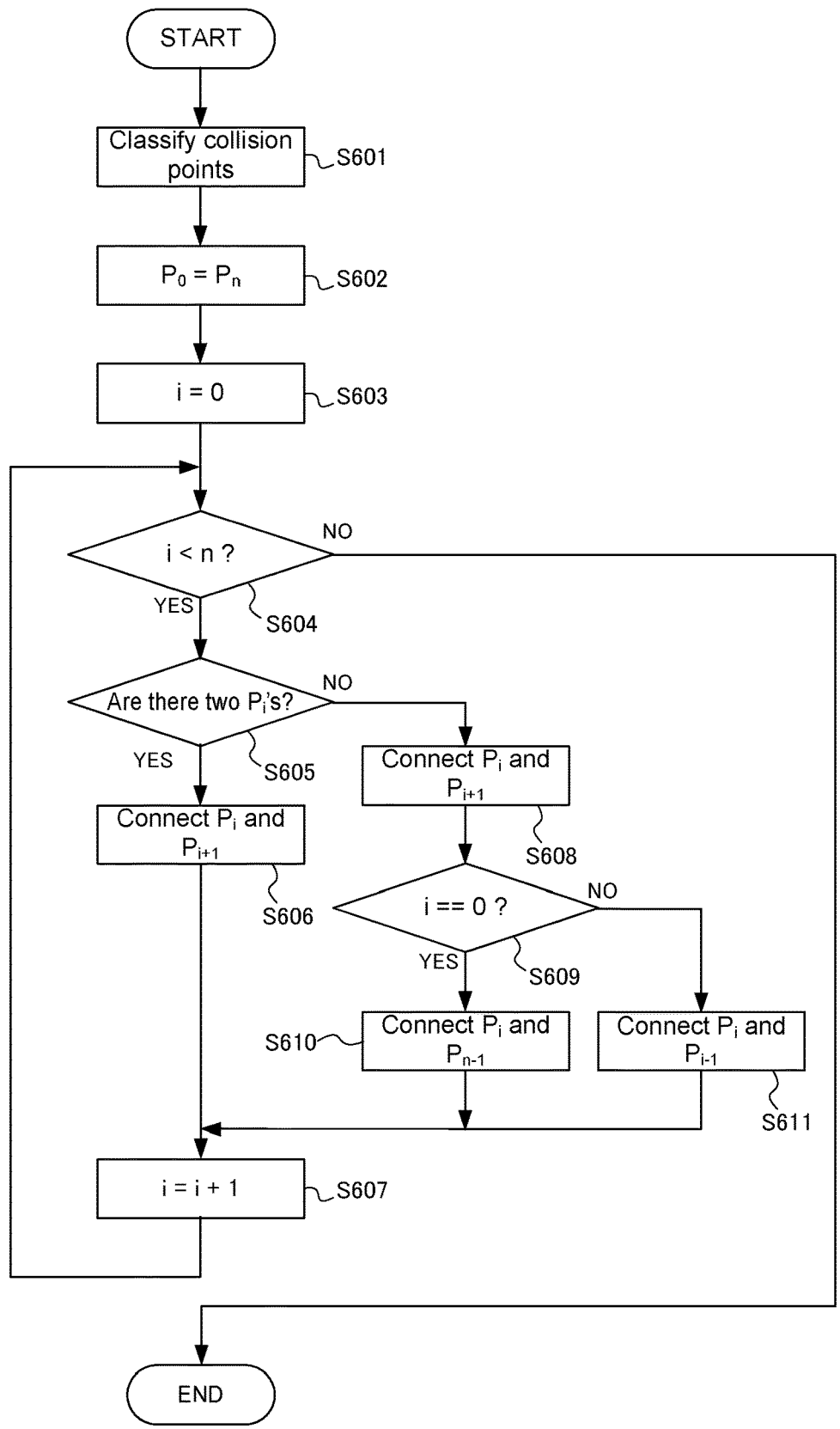
FIG. 17 is a flowchart illustrating the operation of third connection processing.

The following describes the third connection processing. FIG. 17 is a flowchart illustrating the operation of the third connection processing. In this third connection processing, it is assumed that the speed of the target ship is faster than the speed of the own ship, that there exists any vertex that has only one collision point among the plurality of vertices constituting the safe navigation area set for the target ship, and that two collision danger areas contact each other.

As illustrated in FIG. 17, the collision danger area calculator 306 classifies two collision points calculated for each of the plurality of vertices into group A and group B (S601), substitutes the collision point $P_n$ into the collision point $P_0$ (S602), substitutes 0 into the counter variable i (S603), and determines whether the counter variable i is less than n (S604).

When the counter variable is less than n (YES in S604), the collision danger area calculator 306 determines whether two collision points $P_i$ exist (S605).

When two collision points $P_i$ exist (YES in S605), the collision danger area calculator 306 connects the collision point $P_i$ and the collision point $P_{i+1}$ together in each of the groups A and B (S606), increments i (S607), and determines again whether the counter variable i is less than n (S604).

On the other hand, when there are not two collision points $P_i$, namely, there is only one collision point $P_i$ (No in S605), the collision danger area calculator 306 connects the one collision point $P_i$ to collision points $P_{i+1A}$ and $P_{i+1B}$ (S608) and determines whether the counter variable i is 0 (S609).

When the counter variable i is 0 (YES in S609), the collision danger area calculator 306 connects the one collision point $P_i$ to collision points $P_{n-1A}$ and $P_{n-1B}$ (S610) and determines whether the counter variable i is 0 (S607).

On the other hand, when the counter variable i is not 0 (NO in S609), the collision danger area calculator 306 connects the one collision point $P_i$ to collision points $P_{i-1A}$ and $P_{i-1B}$ (S611) and determines whether the counter variable i is 0 (S607).

When the counter variable i is not less than n in step S604 (NO in S604), the collision danger area calculator 306 ends the third connection processing.

Thus, when only one collision point exists for a certain vertex, this one collision point is connected to two collision points of two vertices adjacent to the vertex corresponding to the one collision point to calculate the collision danger area.

As described above, the safe navigation area is set not for the own ship 1 but for the target ship 2, the collision point between each of the vertices constituting the safe navigation area and the own ship 1 is calculated, and the collision danger area is calculated by connecting the calculated collision points, whereby even when the safe navigation area has a shape other than a perfect circle with its center located on the ship, the collision danger area is not affected by the course of the own ship 1. This can enhance the freedom degree of the shape of the safe navigation area without reducing the reliability of the collision danger area.

The embodiment of the present invention has been described by way of example and is not intended to limit the scope of the invention. The novel embodiment can be implemented in various other forms, and various omissions, replacements, and changes can be made without departing from the scope of the invention. This embodiment and its modification are included in the scope and gist of the invention, and are included in the invention described in the scope of claims and its equivalent scope.

REFERENCE SIGNS LIST

1: Own ship
2: Target ship
304: Area setter
305: Collision point calculator
306: Collision danger area calculator

The invention claimed is:

1. A ship navigation assisting device that calculates a collision danger area between own ship and a target ship to assist the navigation of the own ship, comprising:
a processor configured to:
set, for the target ship, a polygonal safe navigation area defined by a plurality of vertices and surrounding the target ship;
calculate, based on a speed of the own ship measured by a global navigation satellite system (GNSS) sensor on the own ship, a relative position between the own ship and the target ship, and a velocity vector of the target ship, a plurality of collision points between each of the plurality of vertices constituting the polygonal safe navigation area and the own ship, wherein the relative position between the own ship and the target ship is calculated based on a position of the own ship measured by the GNSS sensor and a position of the target ship measured by a radar device and the velocity vector of the target ship is measured by the radar device; and
connect the plurality of collision points to one another to calculate the collision danger area.

2. The ship navigation assisting device according to claim 1, wherein the processor is further configured to acquire target ship information comprising at least one of a ship type, a navigation status, a ship length, or a ship width of the target ship, wherein
the processor sets, based on the target ship information, one of a shape of the polygonal safe navigation area, a size of the polygonal safe navigation area, or a relative position between a position of the target ship and a center of the polygonal safe navigation area.

3. The ship navigation assisting device according to claim 2, wherein
the target ship information includes at least the ship type of the target ship, and
the processor sets the relative position between the position of the target ship and the center of the polygonal safe navigation area based on the ship type of the target ship included in the target ship information.

* * * * *